(12) United States Patent
Summerer

(10) Patent No.: US 8,469,698 B2
(45) Date of Patent: Jun. 25, 2013

(54) INJECTION MOLDED SHAPED PLASTIC PART

(76) Inventor: Franz Josef Summerer, Rimsting (DE)

( * ) Notice: Subject to any disclaimer, the term of this patent is extended or adjusted under 35 U.S.C. 154(b) by 560 days.

(21) Appl. No.: 12/458,871

(22) Filed: Jul. 24, 2009

(65) Prior Publication Data

US 2010/0173148 A1 Jul. 8, 2010

(30) Foreign Application Priority Data

Jan. 7, 2009 (DE) .................. 10 2009 003 981

(51) Int. Cl.
*B29C 45/00* (2006.01)

(52) U.S. Cl.
USPC .......... 425/577; 425/553; 425/556; 264/161; 264/328.9; 264/328.7

(58) Field of Classification Search
USPC ............... 425/577, 553, 556; 264/328.7, 161, 264/328.9
See application file for complete search history.

(56) References Cited

U.S. PATENT DOCUMENTS

| | | | | |
|---|---|---|---|---|
| 3,812,228 A | * | 5/1974 | Skoroszewski | 264/54 |
| 4,290,744 A | * | 9/1981 | Dannels et al. | 425/543 |
| 5,186,955 A | * | 2/1993 | Morita et al. | 425/130 |
| 2004/0119204 A1 | | 6/2004 | Nishigaki | |

FOREIGN PATENT DOCUMENTS

| | | |
|---|---|---|
| DE | 10 2005 053 735 | 5/2007 |
| DE | 10 2008 030 823 A1 | 1/2010 |
| JP | 03221424 A | 9/1991 |
| WO | 03/018286 A1 | 3/2003 |

OTHER PUBLICATIONS

German Office Action dated Aug. 5, 2009 and issued in corresponding German Patent Application 10 2009 003 981.3.
German Office Action issued Aug. 12, 2011 in corresponding German Patent Application 10 2009 003 981.3.

* cited by examiner

*Primary Examiner* — Joseph S Del Sole
*Assistant Examiner* — David N Brown, II

(57) ABSTRACT

An injection-compression molding apparatus for producing a shaped plastic part has a first mold plate and a second mold plate, which delimit a component cavity and between which there is a gap in the non-closed state. The apparatus further comprises a plastics compound feeding arrangement for introducing plastics material through the gap into the component cavity, having a gate cavity which is substantially separated from the component cavity when the gap is closed.

10 Claims, 5 Drawing Sheets

INJECTION MOLDED SHAPED PLASTIC PART

CROSS REFERENCE TO RELATED APPLICATIONS

This application claims the benefit of German Patent Application No. 10 2009 003 981.3, filed Jan. 7, 2009, in Germany, the disclosure of which is incorporated herein by reference.

BACKGROUND OF THE INVENTION

The invention relates to the technique of injection molding of shaped plastic parts, in particular sheet-like and possibly transparent shaped parts from plastic.

It is already known to use what is known as the film gate process to avoid sprue marks on sheet-like shaped plastic parts. In particular in the case of optical shaped parts, this process is customary, since sprue marks cannot be tolerated on optical surfaces. In the case of the film gate technique, the injection molding of the shaped part takes place laterally by means, of a film plate. The film plate has a runner, which opens into the component cavity at the edge. After the plastics compound has cooled down and the shaped part has been removed from the injection mold, it is provided with what is known as the film sprue, of a form corresponding to the runner in the film plate. After removal, the film sprue must be detached from the shaped part. On account of the lateral or edge-side injection molding performed in the case of the film gate technique, no sprue marks occur on the main surfaces of the shaped part. However, the additional working step that is required for detaching the film sprue, the loss of material caused by the film sprue, soiling of the shaped part that may occur when the film sprue is detached and optical defects at the points of detachment of the film sprue may be disadvantageous.

Another known sprue-free production process is that known as the fused deposition modeling process. In the case of this process, the "correct" amount of plastics material in the plastic state is deposited in one of the mold plates and distributed and compressed by applying the other mold plate. This process does not allow the production of high-quality shaped parts.

It is already known for the production of sheet-like shaped plastic parts to use what are known as compression processes. In compression processes, the liquid plastics compound is injected into a component cavity between the mold plates that is pre-enlarged or becomes larger during the injection operation, and is subsequently compressed in the direction of its thickness while a mold plate movement is performed. The injection of the plastics compound into the enlarged component cavity makes it easier for the cavity to be filled. In addition, the mold plate movement during the cooling phase compensates for shrinkage and so makes it possible to produce shaped plastic parts of particularly low stress. Compression processes are used in particular for the production of high-quality thin-walled and large-area shaped parts.

BRIEF SUMMERY OF THE INVENTION

One object of the invention may be to provide an injection-compression molding apparatus and an injection-compression molding process with which shaped plastic parts can be produced in a simple and low-cost way with a sprue mark that does not interfere with their use or can be tolerated. Furthermore, the invention aims to provide a shaped plastic part with a sprue mark that does not interfere or could be tolerated.

In one embodiment, an injection-compression molding apparatus for producing a shaped plastic part may comprise a first mold plate and a second mold plate, which delimit a component cavity and between which there is a gap in the non-closed state. The injection-compression molding apparatus may also have a plastics compound feeding arrangement for introducing plastics material through the gap into the component cavity. The plastics compound feeding arrangement may have a gate cavity which is substantially separated from the component cavity when the gap is closed.

Unlike in the case of the film gate technique, when the mold is closed (i.e. when the gap between the mold plates is closed), the component cavity is almost or completely separated from the gate cavity. As a result, in one embodiment a film sprue on the shaped part can be avoided, so that, after the shaped part has been removed from the mold, it is not necessary to remove a sprue from the gate cavity of the shaped part. The injection-compression molding apparatus allows the injection molding of sheet-like shaped parts from the side and therefore has the same advantages as the film gate technique. The injection-compression molding apparatus according to the invention is therefore particularly suitable for the production of sheet-like, thin-walled shaped parts on the main surface areas of which no sprue marks are to be visible. In addition, the easily visible sprue marks on the peripheral surface areas in the case of the film gate are avoided.

In one embodiment, the first mold plate has a first component contour area, delimiting the component cavity, and the second mold plate has a second component contour area, delimiting the component cavity. The gap can then be delimited by a peripheral edge of the first component contour area or a peripheral edge of the second component contour area or by both peripheral edges.

If the peripheral edge of the first component contour area and the peripheral edge of the second component contour area are aligned with one another when the gap is closed, this can make a particularly well-defined break-off line possible between the plastics material of the shaped part and the plastics material in the gate cavity.

One embodiment of the injection-compression molding apparatus is distinguished by a sealing strip, which is movably accommodated in one of the two mold plates. The sealing strip can achieve the effect that the component cavity is sealed even when the mold plates are not closed (i.e. if there is a gap between the mold plates).

In this case, in one embodiment of the injection-compression molding apparatus, the gate cavity may be delimited by the sealing strip and the mold plate in which the sealing strip is not accommodated. This makes a simple configuration of the mold possible, since the gate cavity can be machined into the sealing strip that is required anyhow in many cases.

In one embodiment, the plastics compound feeding arrangement may comprise a number of gate cavities arranged in a distributed manner along the circumference of the component cavity. It may be possible as a result to achieve easier filling and better distribution of the plastics compound in the component cavity, it being possible to prevent the occurrence of flow lines in the shaped part, for example by cascaded compression sequences.

In one embodiment of a process for the injection molding of a shaped plastic part by means of an injection-compression molding apparatus having a first mold plate and a second mold plate, plastics material is injected through a gate cavity into a component cavity formed between the mold plates. At least one of the mold plates is moved, the gate cavity being substantially separated from the component cavity as a result of the plate movement.

In one embodiment, the injection of plastics material into the component cavity takes place through a gap between the mold plates, and the gap is closed while at least one of the mold plates is moved and, as a result, the gate cavity arranged upstream of the gap in the flow path is substantially separated from the component cavity.

One variant of the process may be that, when the mold plates are being moved or when the gap is being closed, a peripheral edge of a first component contour area, delimiting the component cavity, is brought into a position opposite a peripheral edge of a second component contour area, delimiting the component cavity. In this case, a defined break-off line, without flash formation, may be produced between the plastics material in the component cavity and the plastics material in the gate cavity.

In one embodiment, the process makes it possible for the shaped plastic part to be removed from the injection-compression molding apparatus with the removed shaped plastic part already being separate from the plastics material contained in the gate cavity. This means that there is no need for the subsequent detachment of a sprue from the shaped part that is necessary in the case of the film gate process, since the sprue detachment is substantially brought about already by the plate movement or the closing of the gap. In another embodiment, after removal of the part from the mold it may still be necessary for a sprue to be detached, and this can be accomplished very easily on account of the thin, linear connection between the shaped plastic part and the sprue.

A shaped plastic part according to the invention has one or more sprue marks, which are linear. Such sprue marks can be very unobtrusive or scarcely visible and/or placed in such a way that they can be tolerated on the shaped plastic part.

For example, the shaped plastic part may be sheet-like and have a first main surface area, a second main surface area and a peripheral surface area, joining the main surface areas to one another. In this case, the linear sprue mark may be arranged along an edge between one of the main surface areas and the peripheral surface area.

One embodiment of a sheet-like shaped plastic part may be distinguished by the fact that one or both dimensions of the main sides is greater by at least a factor of 10, in particular 50 or even 100, than the peripheral thickness or wall thickness of the shaped plastic part.

One embodiment of a shaped plastic part may be distinguished by the fact that the shaped plastic part is transparent. For example, it may comprise a plastic glazing unit, in particular for a motor vehicle, or a viewing window for a screen, for example of a television or monitor or some other display device.

BRIEF DESCRIPTION OF THE DRAWINGS

The accompanying drawings are included to provide a further understanding of embodiments and are incorporated in and constitute a part of this specification. The drawings illustrate embodiments and together with the description serve, to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
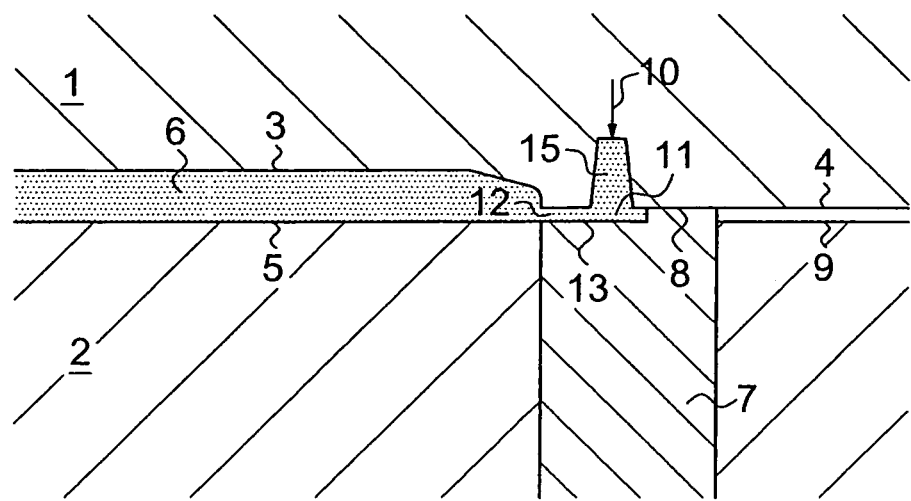
FIG. 1 is a schematic sectional representation of the mold plates of an injection-compression molding apparatus in the peripheral region of the component cavity according to an exemplary embodiment, with the compression gap open.

In the figures, identical or similar parts are designated by the same reference numerals. It is also pointed out that various features and variants of such features are indicated in different embodiments in the figures and in the associated description. The disclosure content of this document also comprises combinations of these described features in relation to different embodiments, insofar as these combinations are not technically contradictory.

As shown in FIG. 1, an embodiment of the apparatus according to the invention may have a first mold plate 1 and a second mold plate 2, which form the two interacting halves of an injection mold. In FIG. 1, the first mold plate 1 is configured as a female mold plate, i.e. is provided with a recess 3 in its plate surface 4 lying opposite the second mold plate 2. In the example represented here, the second mold plate 2 forms the core mold plate, i.e. it has on its plate surface facing the first mold plate 1 a mold core 5, which lies opposite the recess 3. The two mold plates 1, 2 can be moved toward one another, i.e. at least one of the mold plates 1, 2 is movable (not fixed in place). The recess 3 and the mold core 5 form component contour areas, which delimit a component cavity 6, which is located between the component contour areas (recess 3 and mold core 5). The sealing of the component cavity 6 in the open state of the mold plates 1, 2 (see FIG. 1) may take place by means of a sealing strip 7. The sealing strip 7 may be displaceably mounted in the second mold plate 2 and run around the mold core 5. When the mold plates 1, 2 are open, it may stand up with a sealing area 8 on the plate surface 4 of the first mold plate 1 that extends outside the recess 3 and, as a result, ensure that the component cavity 6 is tightly sealed. The sealing strip 7 may be actuated for example by means of a cylinder-piston arrangement (not represented), which is accommodated in the second mold plate 2 or in a further mold plate behind the second mold plate 2. The sealing strip 7 is also technically referred to as a compression strip or lifting strip.

Figure 2:
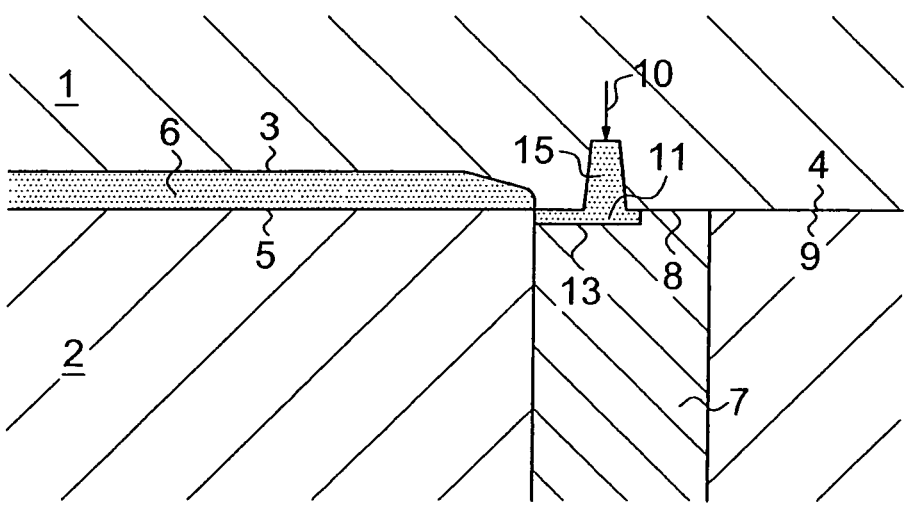
FIG. 2 is a schematic sectional representation of the mold plates of the injection-compression molding apparatus from FIG. 1 in the peripheral region of the component cavity, with the compression gap closed.

FIG. 2 shows the mold in a closed plate position. In a closed plate position, the component contour areas of the mold plates 1, 2 are in a position in relation to one another in which the component cavity 6 has the form complementary to the shaped part to be produced. The closed plate position may be pre-set in the structural design by abutment of the plate surface 4 of the first mold plate 1 against a plate surface 9 of the second mold plate 2.

The injection-compression molding apparatus also has a plastics compound feeding arrangement. It serves for the filling of the component cavity 6 with liquid plastics material. The plastics compound feeding arrangement may comprise a hot runner 10, which is merely schematically represented. The hot runner 10 is in connection with a gate cavity 11. In the open state of the mold plates 1, 2 (see FIG. 1), the gate cavity 11 opens into the compound cavity 6 through a gap 12 between the first mold plate 1 and the second mold plate 2 into the component cavity 6. In the closed state of the mold plates 1, 2 (see FIG. 2), the gap 12 is closed (i.e. relatively small, its gap width may be in the range of the mold tolerances, possibly with the addition of a small additive safety margin). The gate cavity 11 is thereby separated from the mold cavity 6. As still to become clear below, the term separation of the gate cavity 11 from the component cavity 6 is not intended to rule out the possibility of a comparatively thin connection of plastic continuing to exist between the plastics materials contained in the separated cavities 6, 11 after they have cooled down.

Figure 3:
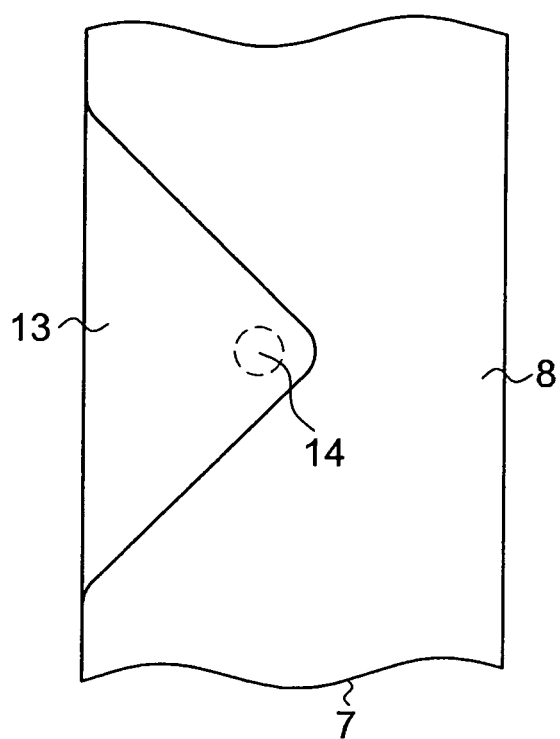
FIG. 3, is a plan view of a portion of a compression strip according to an exemplary embodiment.

The gate cavity 11 may be delimited for example by a recessed portion 13 (milled relief) in the end face 8 of the sealing strip 7 and by the first mold plate 1. FIG. 3 shows the sealing strip 7 in the region of the recessed portion 13 in plan view. The circle 14 indicated by dashed lines marks the position of the hot runner 10. As can be seen in FIGS. 1 and 2, the hot runner 10 may for example open into a conically widening connecting channel 15, which is arranged above the recessed portion 13 of the sealing strip 7 in the first mold plate 1 and forms part of the gate cavity 11. The hot runner 10 may be connected to the connecting channel 15 in such a way that it can be shut off by means of a shut-off device (not represented), for example a needle valve or a shut-off slide valve.

Figure 4:
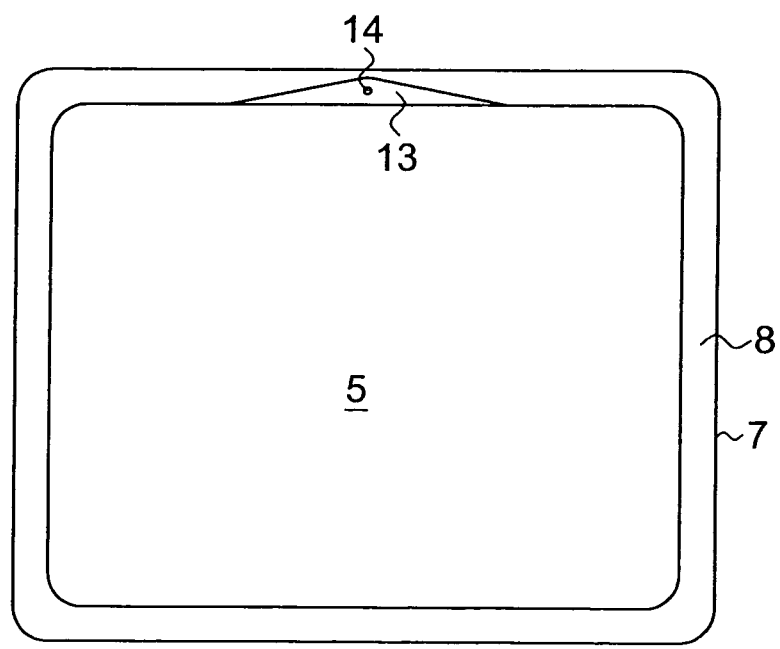
FIG. 4 is a plan view of a compression strip according to an exemplary embodiment.

FIG. 4 shows an exemplary embodiment of the second mold plate 2 with the sealing strip 7 in plan view. The sealing strip 7 may run completely around the mold core 5 in the manner of a frame. The sealing strip 7 may be produced in one piece or from a number of elements. As illustrated in FIG. 4, the sealing strip 7 may contain a gate cavity 11, which is arranged for example midway along the longitudinal side with the larger dimension. It is also possible, in a way that is not represented, for the gate cavity 11 to have a number of runners, which open into the component cavity 6 at various points. Furthermore, a number of gate cavities 11 may be provided, supplied by a number of hot runners 10. The feeding of the plastics material may take place on one or more sides of the component cavity 6. To avoid flow lines, cascade injecting methods may be used, in which the shut-off devices at the end of the hot runners 10 are opened and closed at different points in time. The rectangular form of the mold core 5 (with rounded corners) that is represented by way of example in FIG. 4 may of course be differently configured, for example circular, etc.

Figure 5:
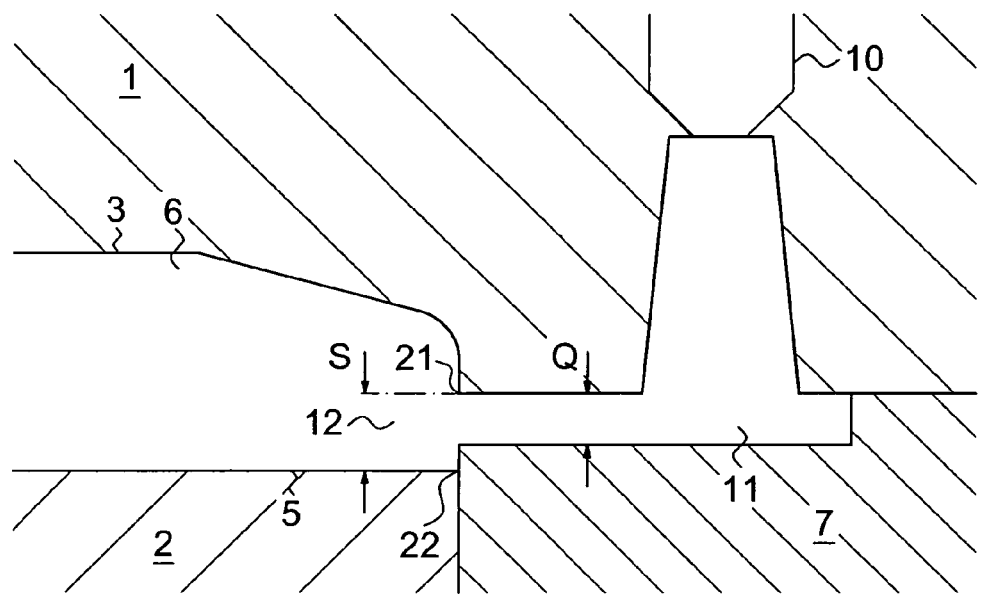
FIG. 5 is an enlarged representation of the arrangement from FIG. 1 according to a configurational variant.
Figure 6:
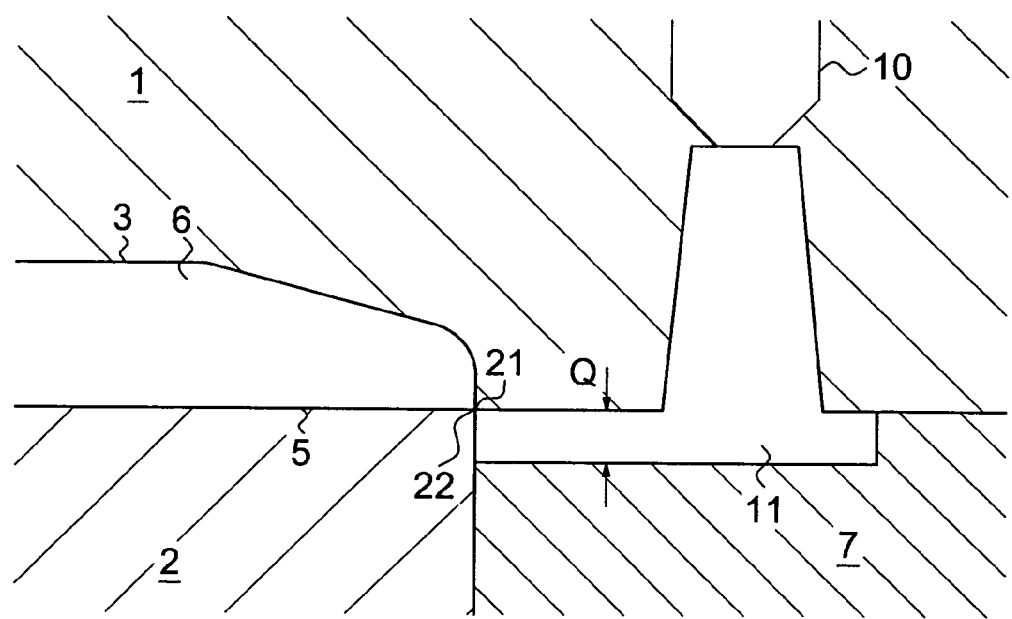
FIG. 6 is an enlarged representation of the arrangement from FIG. 2.

An example of a process for producing an exemplary embodiment of a shaped plastic part is explained below on the basis of FIGS. 5 and 6.

At first, the mold plates 1, 2 are in an open position, in which a gap 12 of the width S is present between the peripheries 21, 22 of the two component contour areas in the mold plates 1 and 2, respectively. In the present example, the periphery 21 is provided by the peripheral edge of the recess 3 and the periphery 22 is provided by the peripheral edge of the mold core 5. The width S may be greater, the same or smaller than the cross-sectional width Q of the gate cavity 11 in the region of the depressed portion 13 of the sealing strip 7.

When gap 12 is open, filling of the component cavity 6 takes place. The component cavity is in this case overfilled by the shrinkage volume. The injected plastics material is then cooled under pressure. The reduction in volume of the plastics material accompanying the cooling is compensated by two mold plates 1, 2 being moved toward one another, until the shaped part to be produced has assumed its nominal dimensions at the demolding temperature. This operation is referred to as closing of the mold plates 1, 2. The closing of the mold plates 1, 2 has the effect that the gap dimension S is reduced in size, while the cross section Q of the gate cavity 11 remains unchanged. As represented in FIG. 6, when the mold plates 1, 2 are closed, the gap 12 is closed, i.e. the gap dimension S is virtually zero, i.e. is for example in the range of approximately 5/10 mm, 1/10 mm or less. Smaller gap dimensions S of less than 5/100 mm can also be achieved. The closing of the gap S as a result of the mold movement during the compressing operation has the effect that the component cavity 6 and the gate cavity 11 are consequently substantially separated from one another.

The separation of the component cavity 6 and the gate cavity 11 may have the consequence that, at the latest when the shaped part is removed from the mold (demolding), the connection of plastic between the shaped part and the cooled plastics material in the gate cavity 11 breaks off. It is also possible for this connection of plastic to break off already during the shrinkage process in the mold.

Furthermore, the connection of plastic may also be broken off by a lowering of the sealing strip 7. A linear sprue mark, which is usually barely discernible, is left behind on the shaped part. The shaped part is then removed from the injection-compression molding apparatus, the removed shaped part being separate from the plastics material contained in the gate cavity 11.

It is also possible for the thin connection of plastic between the shaped part and the cooled plastics material in the gate cavity 11 to survive removal, in spite of the separation of the component cavity 6 and the gate cavity 11. This may occur if the gap dimension S with the mold plates 1, 2 closed (i.e. with the gap 12 "closed") is comparatively large, for example larger than a few tenths of a millimeter. In this case, subsequent detachment of the sprue is required, which however requires significantly less effort than in the case of the conventional film gate as a result of the small thickness of the connection of plastic.

If, in the closed state of the mold plates 1, 2 (i.e. with the nominal dimension of the shaped part to be produced), the peripheral edge 21, the recess 3 and the peripheral edge 22 of the mold core 5 are aligned with one another or are in position opposite one another, i.e. the distance between them defines the opening width of the gap 12, a defined separating line is obtained between the component cavity 6 and the gate cavity 11. The detachment of the connection of plastic between the shaped part and the cooled plastics material in the gate cavity 11 then takes place by constriction or pinching between the two edges 21, 22 directly on the shaped part, i.e. formation of flash is avoided. All that remains on the shaped part is a barely discernible, linear sprue mark, which is not visible even in the case of shaped parts in which it is possible to view the border of the shaped part (for example a viewing window for screens). In one embodiment, the shaped part can be used without secondary refinishing of the sprue mark.

Figure 7:
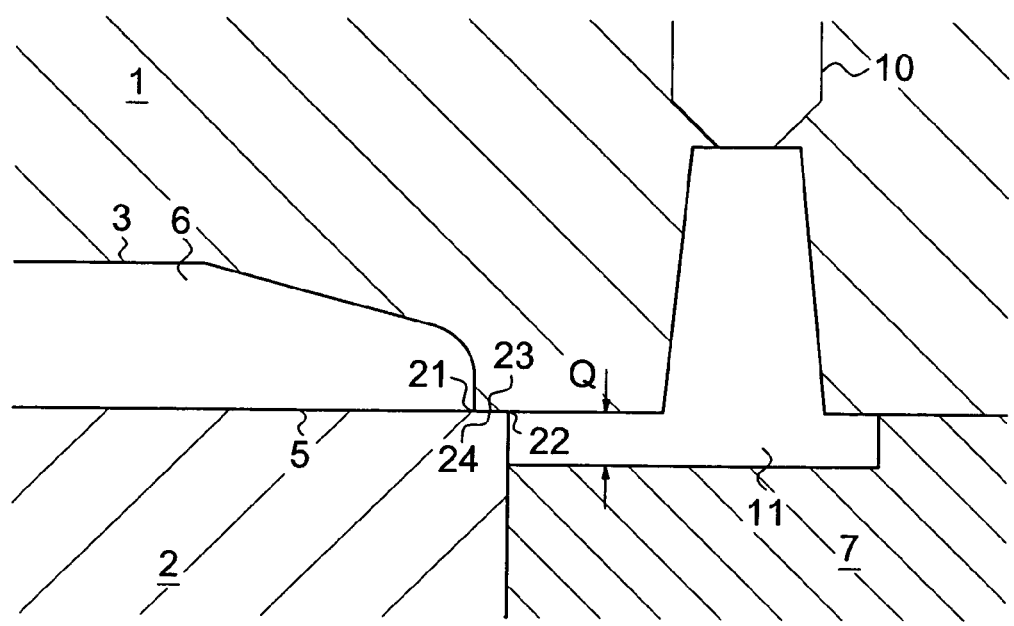
FIG. 7 is an enlarged representation of the arrangement from FIG. 2 according to a configurational variant.

However, it is also possible for the peripheral edges 21, 22 to be offset in relation to one another in the closed state of the mold plates 1, 2, i.e. for the gap dimension S to have a smaller value than the distance between the peripheral edges 21, 22, see FIG. 7. The offset of the peripheral edges 21, 22 (in the horizontal direction) may for example lie in the range from 0.05 mm to 1.0 mm or a few mm. In this case, the detachment of the connection of plastic between the shaped part and the cooled plastics material in the gate cavity 11 can likewise take place during demolding, but the break-off line may be less well-defined with respect to the path it follows, unless additional measures are taken, such as cutting edges or the like between the abutting surface areas 23, 24 of the first and second mold plates 1, 2 between the component cavity 6 and the gate cavity 11. It may therefore be necessary after removal also to remove peripheral flash or—if no sprue detachment took place during or before demolding—for sprue detachment also to be carried out. As already mentioned, here too, a usually only barely discernible, linear sprue mark is left behind on the shaped part after flash removal.

In a way not represented, it is also conceivable for the mold core 5 to protrude beyond the plate surface 9 of the second mold plate 2 or for other structural design measures to be used to achieve the effect that a small piece of it enters the recess 3 in the first mold plate 1 during closing of the mold, and the peripheral edge 22 thereby slides over the peripheral edge 21. In this case, after removal of the shaped part from the mold and the separation of the connection between the plastics material in the component cavity 6 and the plastics material in the gate cavity 11 preferably taking place at the same time, it may likewise be necessary for flash removal to be performed. Here too, after flash removal, a usually only barely discernible, linear sprue mark is left behind on the shaped part.

The shaped plastic part may be a transparent panel, such as for example a window, for example a window pane of a motor vehicle, including a sliding roof, a panoramic window, etc., or a covering or viewing window for screens of display devices (for example monitors, television screens, touch-screens, etc.). The wall thickness of the shaped plastic part may for example lie between 2 mm and 10 mm and be substantially constant over the entire shaped plastic part. However, values outside this range are also possible. The side lengths of the shaped plastic part likewise depend on the application area and may vary greatly. For example, they may be within the suitable dimensions for viewing panels, screens, windows, in particular motor vehicle windows or sliding roofs, i.e. they may for example be greater than the wall thickness of the shaped plastic part by more than a factor of 10, 30, 50, 100 or even 300. For example, at least one of the side dimensions of the shaped plastic part 1 may be greater than 0.5 m, 0.7 m or in particular 1.0 m and the wall thickness of the shaped plastic part may for example lie in the range of approximately 3 mm. A transparent panel with such or similar dimensions may for example be used as a viewing window for screens of display devices or glazing in a motor vehicle. In particular in the case of viewing windows for screens of display devices (televisions, monitors, etc.), the invention offers particular potential, since product requirements dictate that such viewing windows often cannot be provided with a molded-on black border, and therefore the shading technique of a sprue mark that is described in German utility model DE 20 2004 003 468.9 is either not possible or is not deemed adequate in terms of quality.

Figure 9:
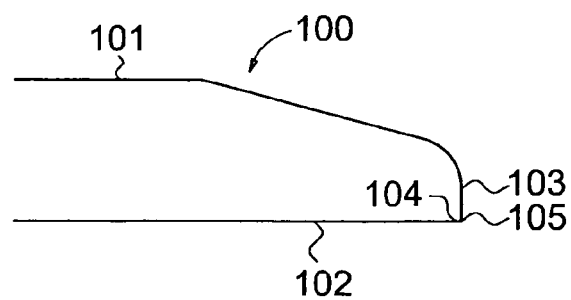
FIG. 9 is a sectional view of a peripheral region of a produced shaped plastic part along the line X-X in FIG. 8.
Figure 8:
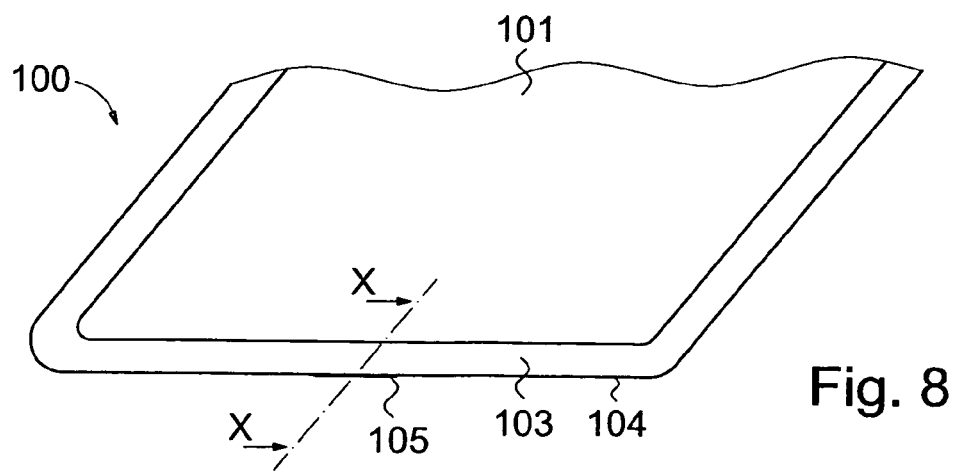
FIG. 8 is a perspective view of a peripheral region of a produced shaped plastic part.

FIG. 8 shows in a perspective, representation a portion of a shaped plastic part 100 according to an embodiment of the invention. In FIG. 9, a section along the line X-X is shown. The shaped plastic part 100 may be configured according to the above specifications. The shaped plastic part 100 is for example sheet-like and has a first main surface area 101, a second main surface area 102 and a peripheral surface area 103, which joins the first main surface area 101 to the second main surface area 102 at the border of the component. In the present example, the first main surface area 101 and the peripheral surface area 103 are defined by the component contour area in the first mold plate 1, while, the second main surface area 102 of the shaped plastic part 100 is defined by the component contour area in the second mold plate 2. At the edge 104 of the shaped part, the two component contour areas butt one against the other when the mold is closed. One or more portions of the edge 104 of the shaped part correspond to the path followed by the (closed) gap 12 in the case of the mold configurations represented in FIGS. 6 and 7.

The angle of the edge 104 of the shaped part may for example be approximately 90°, as represented, but generally may vary over a wide range and lie for example between 10° and 150° or even outside these limits. In particular, unlike in the case of the conventional film gate process, acute angles are also possible for the edge of the shaped part. For example, the edge angle may be less than 70° or 50° or assume still smaller values, for example below 40° or 30°. A further advantage of the process according to the invention is that smaller wall thicknesses than in the case of the conventional film gate can be achieved, for example below 2 mm or even 1 mm.

As can be seen from FIG. 8, a linear sprue mark 105 occurs at the edge 104 of the shaped part, the length of said mark corresponding to the width of the opening of the recessed portion 13 in the sealing strip 7. As explained in the description of the mold, it is also possible for a number of linear sprue marks 105 to occur, possibly arranged in a distributed manner over a number of the sides of the shaped plastic part 100. The linear width corresponds to the specifications given for the gap width S with the gap 12 "closed", i.e. may for example be in the range of approximately 5/10 mm, 1/10 mm or less, even smaller linear widths of less than 5/100 mm also being achievable.

The shaped part 100 produced and removed from the mold in the way described may be fitted directly into its installation position—possibly after performing cleaning and coating steps—without it being necessary to cover the linear sprue, mark 105 or the like, even if it is exposed to view.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:
1. An injection-compression molding apparatus for producing a shaped plastic part, comprising:
    a first mold plate and a second mold plate, which delimit a component cavity having, in a closed state of the first and second mold plates, the shape of the shaped plastic part and between which there is a gap in the non-closed state;
    a plastics compound feeding arrangement for introducing plastics material through the gap into the component cavity, having a gate cavity which is substantially separated from the component cavity when the gap between the first mold plate and the second mold plate is closed; and
    a sealing strip that is movably accommodated in only one of the first and second mold plates, wherein, in an open state of the first and second mold plates and in the closed state of the first and second mold plates, the gate cavity is delimited by the mold plate in which the sealing strip is not accommodated and by an end face of the sealing strip facing the mold plate in which the sealing strip is not accommodated.

2. The injection-compression molding apparatus as claimed in claim 1, wherein
the first mold plate has a first component contour area, delimiting the component cavity,
the second mold plate has a second component contour area, delimiting the component cavity, and
the gap is delimited by a peripheral edge of the first component contour area or a peripheral edge of the second component contour area or both peripheral edges.

3. The injection-compression molding apparatus as claimed in claim 2, wherein the peripheral edge of the first component contour area and the peripheral edge of the second component contour area are aligned with one another when the gap is closed.

4. The injection-compression molding apparatus as claimed in claim 1, wherein the end face of the sealing strip is provided with a recess which opens into the component cavity.

5. The injection-compression molding apparatus as claimed in claim 1, wherein the plastics compound feeding arrangement comprises a number of gate cavities arranged in a distributed manner along the periphery of the component cavity.

6. The injection-compression molding apparatus as claimed in claim 1, wherein the plastics compound feeding arrangement comprises a shut-off device arranged on the inflow side of the gate cavity.

7. The injection-compression molding apparatus as claimed in claim 2, wherein the first component contour area is formed by a depression in the first mold plate.

8. The injection-compression molding apparatus as claimed in claim 2, wherein the second component contour area is formed by a protruding core region in the second mold plate.

9. An injection-compression molding apparatus for producing a shaped plastic part, comprising:
a first mold plate and a second mold plate, which delimit a component cavity having, in a closed state of the first and second mold plates, the shape of the shaped plastic part and between which there is a gap in the non-closed state;
a plastics compound feeding arrangement for introducing plastics material through the gap into the component cavity, having a gate cavity which is substantially separated from the component cavity when the mold plates are closed; and
a sealing strip that is movably accommodated in one of the first and second mold plates, an end face of the sealing strip comprising a recessed portion delimiting the gate cavity and a sealing area sealing the component cavity in an open state of the first and second mold plates.

10. The injection-compression molding apparatus as claimed in claim 1, wherein one of the first and second mold plates is movable and the other of the first and second mold plates is stationary, and the sealing strip is movably accommodated in the movable mold plate.

* * * * *